(No Model.)  3 Sheets—Sheet 1.
T. A. EDISON.
REGULATOR FOR DYNAMO ELECTRIC MACHINES.
No. 264,661. Patented Sept. 19, 1882.
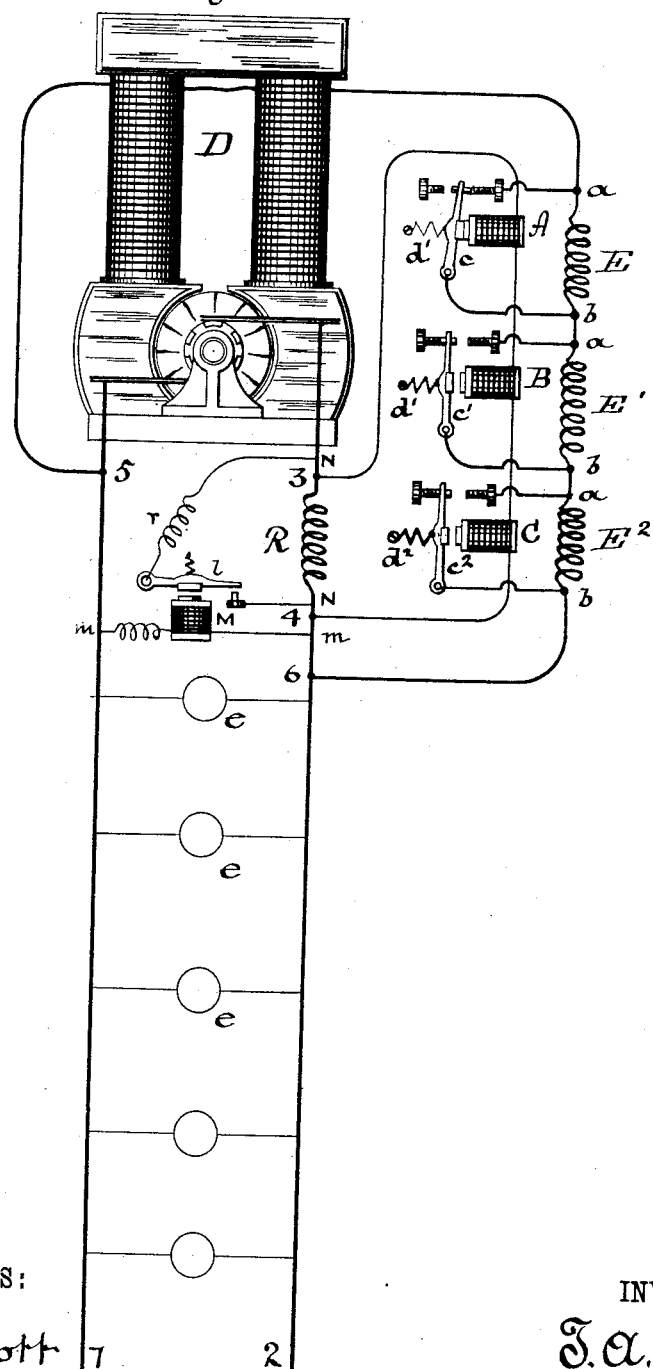
WITNESSES:
O. D. Mott
Thomas E. Birch
INVENTOR:
T. A. Edison
BY Rich'd N. Dyer,
ATTORNEY.

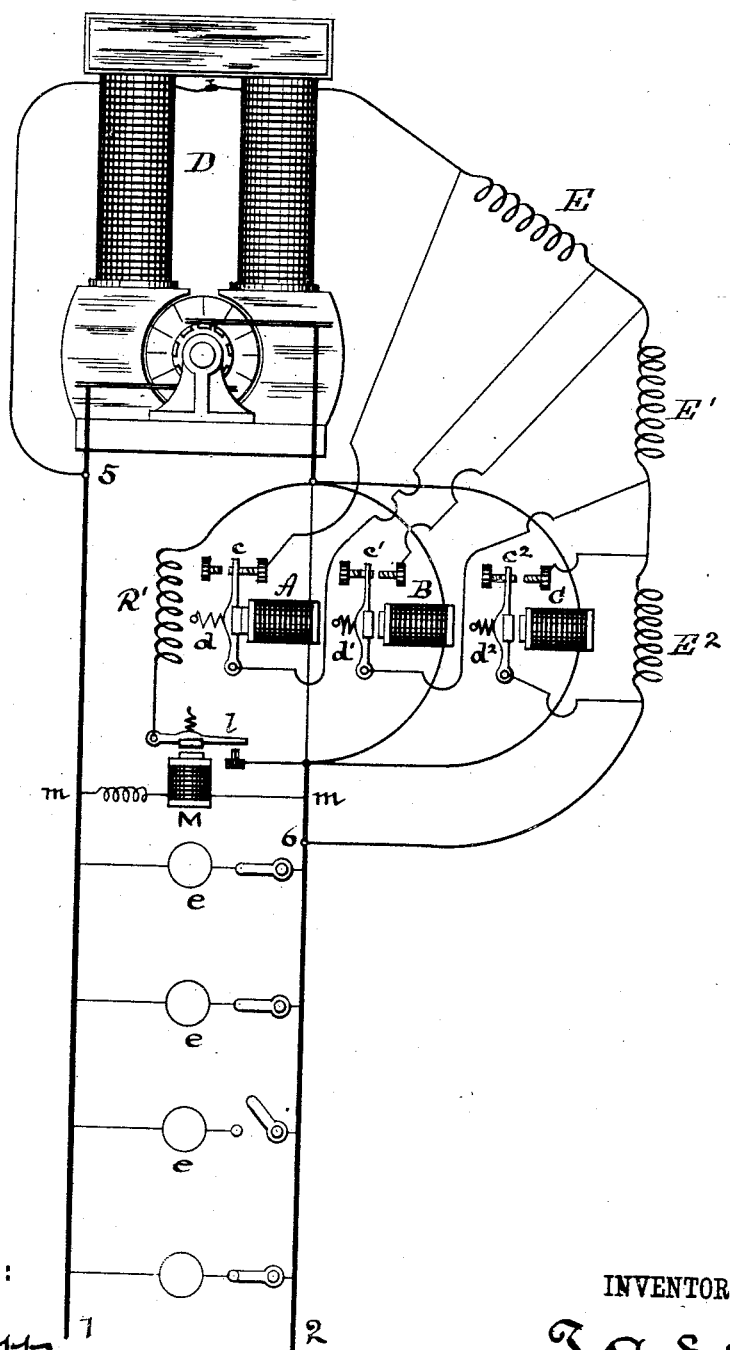

(No Model.)  3 Sheets—Sheet 3.
T. A. EDISON.
REGULATOR FOR DYNAMO ELECTRIC MACHINES.
No. 264,661. Patented Sept. 19, 1882.
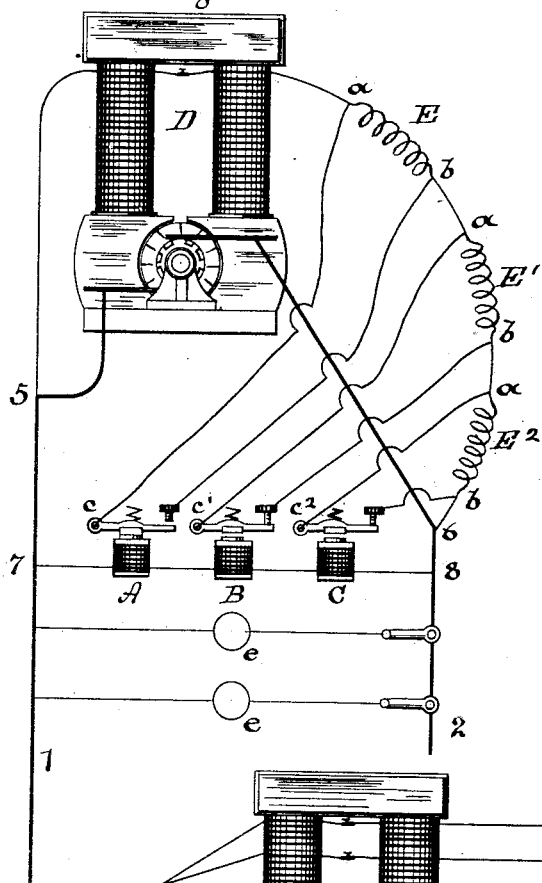
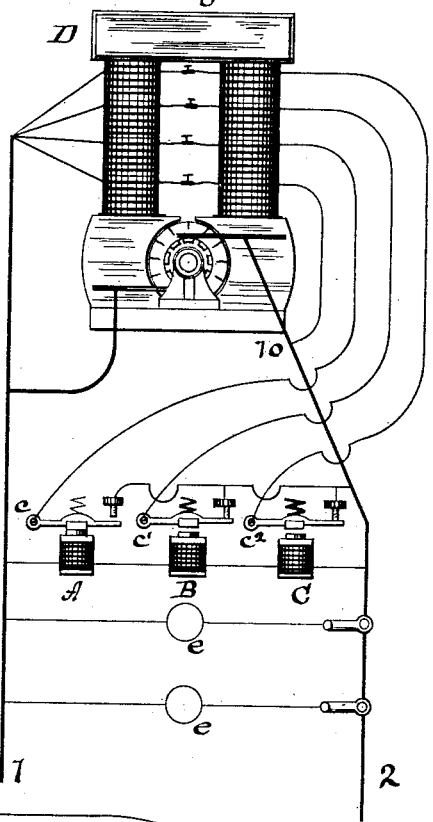
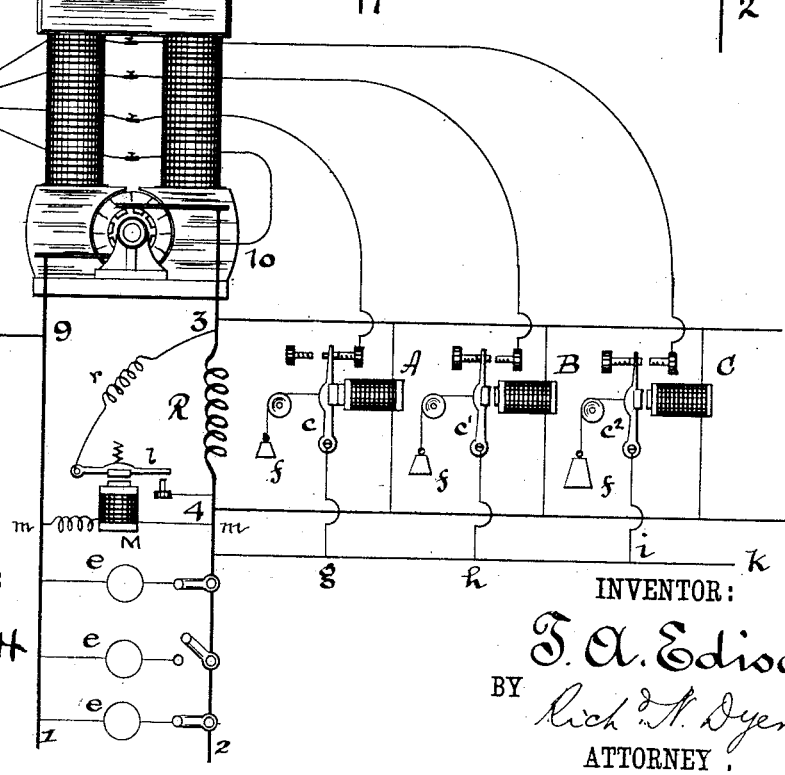
WITNESSES:
O. D. Mott
H. W. Seely
INVENTOR:
T. A. Edison
BY Rich. N. Dyer
ATTORNEY.

UNITED STATES PATENT OFFICE.

THOMAS A. EDISON, OF MENLO PARK, NEW JERSEY.

REGULATOR FOR DYNAMO-ELECTRIC MACHINES.

SPECIFICATION forming part of Letters Patent No. 264,661, dated September 19, 1882.

Application filed August 7, 1882. (No model.)

*To all whom it may concern:*

Be it known that I, THOMAS A. EDISON, of Menlo Park, in the county of Middlesex and State of New Jersey, have invented a new and useful Improvement in Regulating the Generative Capacity of Dynamo or Magneto Electric Machines, (Case No. 399;) and I do hereby declare that the following is a full and exact description of the same, reference being had to the accompanying drawings, and to the letters of reference marked thereon.

The object of this invention is to produce new and efficient means for varying the current energizing the field-magnet of a dynamo or magneto electric machine supplying a multiple-arc system of electric distribution for the purpose of regulating the generation of current by such machine. This I accomplish, first, by the use of several electro-magnets, each provided with an armature-lever, the relation between each armature-lever and its magnet being different from that of the others—that is, different currents being required to energize each magnet sufficiently to cause it to move its armature—this being accomplished by employing, in connection with the armature, different springs or weights by different windings of the various magnets, by varying the normal distances between the magnets and their armatures, or in any other suitable manner. The energy of these magnets is varied by variations in the current flowing in the main circuit from the dynamo or magneto electric machine, caused by the addition or removal of lamps or other translating devices in the system. The movements of the armatures above mentioned cause the opening and closing of circuits, the closure of each of which causes a greater amount of current to flow through the field-magnet of the generator. The electro-magnets may be placed directly in the main circuit of the generator, or in multiple-arc or derived circuits, or in a shunt-circuit therefrom, the circuits and contact-points connected with their armatures being arranged differently, according to the different conditions arising from the different positions in which the magnets are placed. When the magnets are placed in multiple-arc circuits from the mains their action compensates also for differences in the speed of the engine actuating the generator, which cause variations in the current produced; but when such magnets are in a shunt or in the main line this is not the case, and I therefore provide other means for this purpose. A magnet or magnets are placed in one or more multiple-arc circuits from the mains. Each magnet is provided with an armature-lever retracted by a spring and provided with contact-points, so that when attracted by its magnet the armature will close a circuit whose closure causes a decrease in the amount of current flowing through the magnets which control the field of force of the generator. Such circuit brings a shunt around the resistance, which turns current into the shunt containing the last-mentioned magnets, or a new branch of the main line passing around said magnets. Thus, if a sudden increase of speed in the engine causes an unusual flow of current, the magnet in the multiple-arc circuit causes less current to flow through those in the shunt, whose energy, being diminished, will cause a decrease in the current energizing the field-magnet of the generator, as before set forth.

The invention may be better understood by reference to the accompanying drawings, Figures 1, 2, 3, 4, and 5 being diagrammatic views of different forms thereof.

In Fig. 1 electro-magnets A B C are placed in a shunt, 3 4, around the resistance R from the main conductor 2, which leads from the dynamo-electric machine D.

5 6 is the field-circuit of such machine, and contains a series of resistances, E E' E$^2$. The field-circuit is here shown as a multiple-arc circuit from the main line; but it is evident that it may be a circuit supplied from an external source, such as another dynamo or magneto electric machine or a battery.

A shunt-circuit, $a\ b$, is formed around each of the resistances E E' E$^2$, a portion of each shunt being formed by one of the armature-levers $c\ c'\ c^2$ of the magnets E E' E$^2$. These pivoted armatures are provided with springs $d\ d'\ d^2$, which differ in tension.

When only a few lamps or other translating devices, $e\ e$, are placed in multiple-arc circuits on the main line, all the resistances E E' E$^2$ may be in the field-circuit 5 6. As more lamps are turned on a greater electro-motive force is produced in the shunt-circuit in consequence of the decrease in resistance of the main line. Therefore the armature $c$, which has the weakest spring, is attracted by the magnet A and closes the shunt $a\ b'$ around the resistance E, thus cutting the latter out of circuit and allowing more current to pass through the field-magnet of the generator, so that enough current is supplied for the additional translating devices. A still further addition to the number of the last causes the successive drawing forward of the armature $c'\ c^2$ and the throwing out of the resistances $E'\ E^2$. It is evident that any desired number of electro-magnets, armatures, and resistances may be used.

M is another electro-magnet, placed in a multiple-arc circuit, $m\ m$, and provided with a pivoted armature, $l$, which forms part of a shunt-circuit, N N, around the resistance R. A sudden increase of current, caused by an increase in the speed of the engine or by any unusual cause, increases the energy of the magnet M, which draws forward its armature $l$ and completes the circuit $3\ n$, which, by opening a new path for the current, causes a less portion of it to pass through the magnets A B C, so that their energy is decreased, and the resistances E $E'\ E^2$ are successively placed in the field-circuit as desired.

A resistance, $r$, may be placed in the circuit N N, so that it shall not take too large a portion of the current. It is evident that any desired number of magnets M and circuits N N of different resistances may be provided, in order that successive paths may be opened for the current, and that in the circuit $3\ 4$ be gradually diminished. In the form shown in Fig. 2 the magnets A B C are all placed directly in the main line in multiple-arc relation to each other.

Another similar branch of the main conductor contains a resistance, R', and the armature-lever $l$ of the electro-magnet M, the latter being in a multiple-arc circuit, $m\ m$, from the main line. The successive drawing forward of the armatures $c\ c'\ c^2$ cuts out the resistances E $E'\ E^2$ from the field-circuit $5\ 6$ of the generator D. An increase of current in the multiple-arc circuit $m\ m$, caused not by the condition of the translating devices, but by an increase in the speed of the motor driving the armature of the generator, causes an increase in the attractive force of the magnet M, which, by drawing forward its pivoted armature $l$, completes the circuit containing the resistance R, and thus by a further division of the current that flowing through the magnets A B C is lessened, and the resistances E $E'\ E^2$ are placed in circuit. It is evident in this case as well as in the preceding that the number of magnets M and of different paths for the current may be increased as desired.

In Fig. 3 the magnets A B C are placed in a multiple-arc, circuit, $7\ 8$. Being in a multiple-arc circuit, such magnets are weakened by the addition of translating devices $e\ e$, and therefore the shunt-circuits $a\ b$ around resistances E are closed by the making of the back contacts instead of their forward ones. With this exception the operation is similar to those previously described. Instead of closing shunt-circuits around resistances in the field-circuit, the magnets A B C may be used to close additional circuits around the field-magnet, which is wound in bobbins or sections of wire, each of which forms part of a circuit, including one of the pivoted armature-levers $c\ c'\ c^2$.

In Fig. 4 the magnets are placed in the shunt-circuit $3\ 4$ around resistance R. While here shown, for convenience, as in multiple arc across the wires of the shunt, it is evident that they may be placed as in Fig. 1. The present arrangement of the magnets is similar to that in Fig. 2. Instead of springs of different tensions, the armatures $c\ c'\ c^2$ are here provided with different weights $f$. A field-circuit of a constant high resistance, $9\ 10$, is used to primarily energize the field-magnet of the generator D. This circuit may, if desired, be supplied from any external source instead of from the machine itself. The attraction of the armature $c$ by the magnet A causes the closure of the circuit $9\ g$; that of the armature $c'$ causes the closure of $9\ h$, while $9\ i$ is closed by the attraction of the armature $c^2$. It is evident that $g$, $h$, and $i$ might be connected directly to the conductor 2 instead of reaching it through a wire, $k$. In this case, also, a magnet, M, in a derived circuit, $m\ m$, is used to close a shunt-circuit around the resistance R.

The form shown in Fig. 5 is similar to the preceding, except that now the magnets A B C are placed in a multiple-arc circuit, $7\ 8$, and the circuits through the field are completed through the back instead of the front contacts of the armature, as before explained.

What I claim is—

1. The combination, with a dynamo or magneto electric machine and translating devices arranged in multiple-arc circuits therefrom, of a series of independent devices operated by the current generated and arranged to act successively as more translating devices are placed in circuit to increase the current energizing the field-magnet of the generator, substantially as set forth.

2. The combination, with a dynamo or magneto electric machine and translating devices arranged in multiple-arc circuits therefrom, of a series of electro-magnets energized by the current generated and arranged to operate successively as more translating devices are placed in circuit to close circuits, whereby the current energizing the field-magnet of the generator is increased, substantially as set forth.

3. The combination, with a dynamo or magneto electric machine and translating devices arranged in multiple-arc circuits therefrom, of a series of electro-magnets energized by the current generated, and each provided with a pivoted armature-lever, the relation between each magnet and its armature differing from that of each other magnet and armature, as explained, and circuits, as described, the movement of each armature opening or closing a circuit whose closure increases the current energizing the field-magnet of the generator, substantially as set forth.

4. The combination, with a dynamo or magneto electric machine and translating devices arranged in multiple-arc circuits therefrom, of a series of electro-magnets energized by the current generated, and armature therefor, different amounts of current being required to cause each magnet to attract its armature, and circuits and resistances, as described, the movement of each armature causing the throwing of a resistance in or out of the field-circuit, substantially as set forth.

5. The combination, with a dynamo or magneto electric machine and translating devices arranged in multiple-arc circuits therefrom, of a series of devices operated by the current generated, and arranged to act successively as more translating devices are placed in circuit to increase the current energizing the field-magnet of the generator, and a device or series of devices, also operated by the current generated, and arranged to act upon an increase of said current to decrease the current affecting the first-mentioned series of devices, thereby decreasing the current in the field-circuit of the generator, substantially as set forth.

6. The combination, with a dynamo or magneto electric machine and translating devices arranged in multiple-arc circuits therefrom, of a number of electro-magnets placed in divisions of the main line or in a shunt therefrom, and arranged to act successively as more translating devices are placed in circuit to increase the current energizing the field-magnet of the generator, and an electro-magnet placed in a multiple-arc circuit from the main line, and arranged to act upon an increase of the current generated to close circuits which shall draw off a portion of the current energizing the magnets in the shunt-circuit or divisions of the main line, substantially as set forth.

7. The combination of the following: the field-magnet of a dynamo-electric machine placed in a multiple-arc circuit, the armature of said machine placed in another multiple-arc circuit, lamps or other translating devices placed in other multiple-arc circuits, (all such multiple-arc circuits being derived from the same main conductors,) and a series of independent devices operated by the current generated, and arranged to act successively as more translating devices are placed in circuit to increase the current energizing the said field-magnet, substantially as set forth.

This specification signed and witnessed this 10th day of February, 1882.

THOMAS A. EDISON.

Witnesses:
H. W. SEELY,
WM. H. MEADOWCROFT.